Patented Apr. 1, 1930

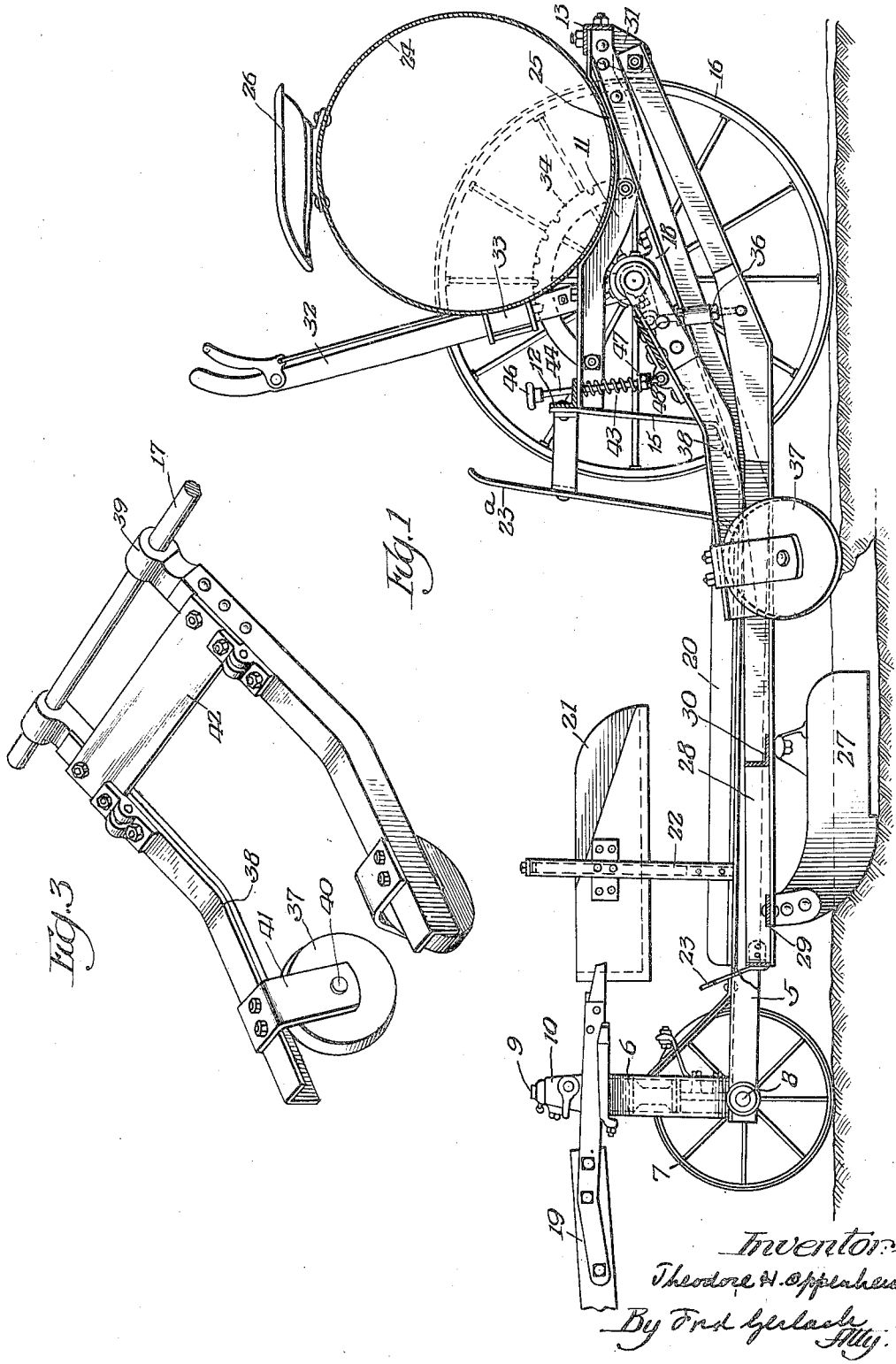

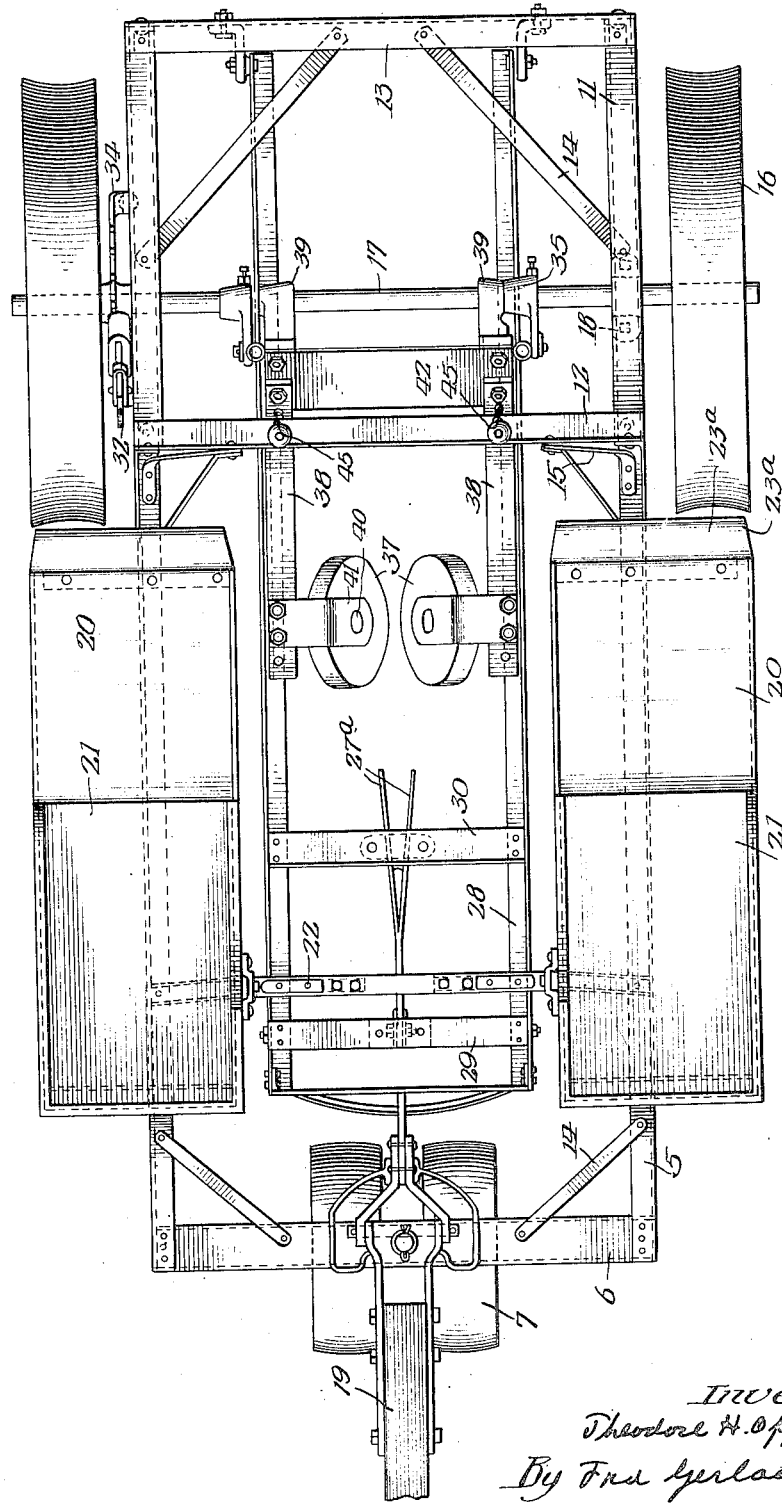

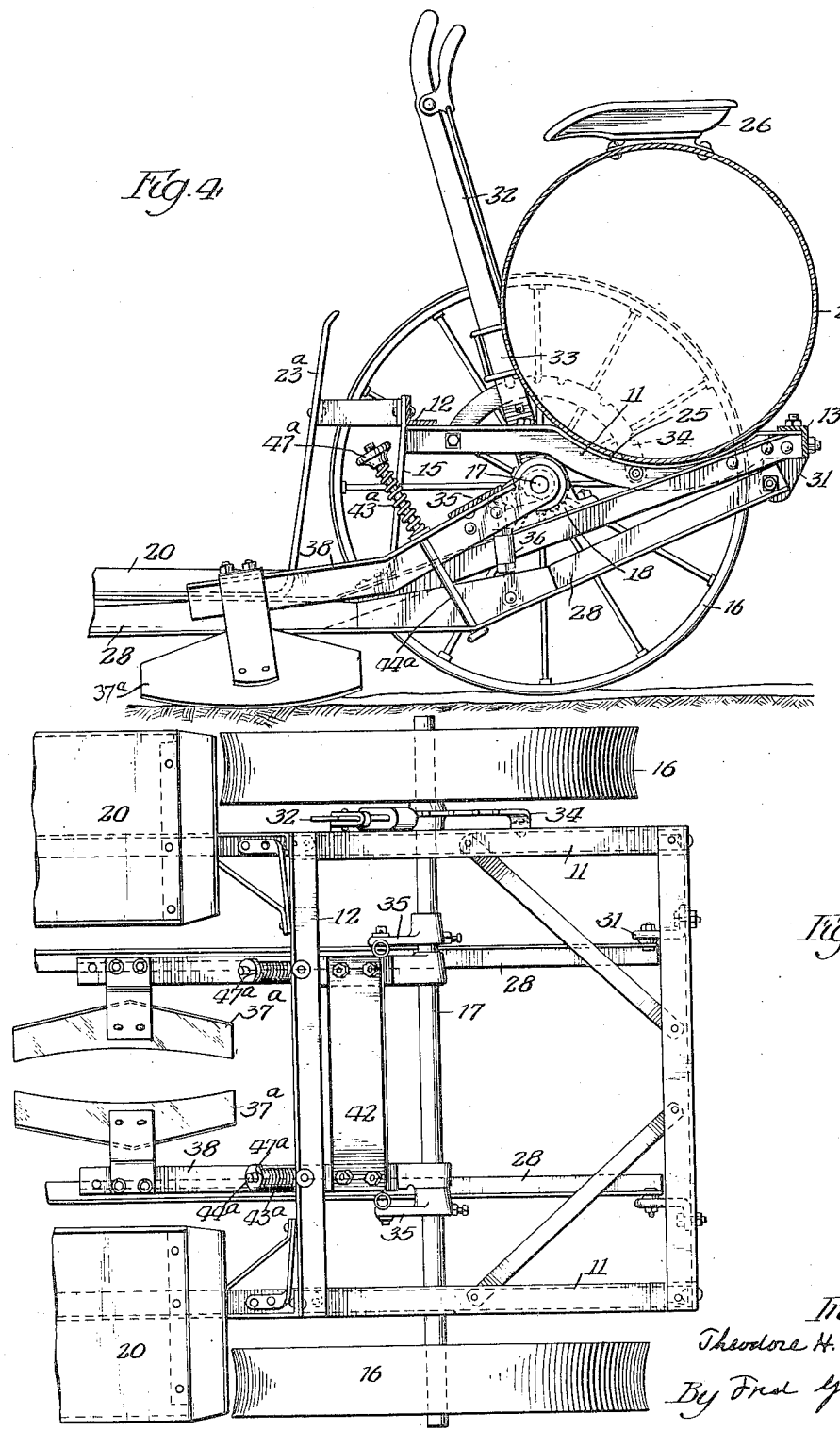

1,753,017

UNITED STATES PATENT OFFICE

THEODORE H. OPPENHEIM, OF COLDWATER, OHIO, ASSIGNOR TO THE NEW IDEA SPREADER COMPANY, OF COLDWATER, OHIO, A CORPORATION OF OHIO

TRANSPLANTER

Application filed May 18, 1928. Serial No. 278,796.

The invention relates to transplanters and more particularly to those transplanters which comprise a carrying frame embodying front and rear ground wheels with seats for operatives or plant setters between them, a sub-frame having a furrow-opener at the front end and its rear end pivotally mounted so that it may be adjusted vertically and locked in place to cause the opener to cut a furrow of the desired depth and a spring-pressed floating frame overlying the sub-frame and carrying a pair of wheels or plates which operate in unison to press the displaced soil around the roots of the plants and close the furrow.

In transplanters of this character, the sub-frame and the floating frame are generally formed of angle bars which are spaced apart so as to leave spaces between the furrow-opener and presser devices through which the plants may be deposited by the operatives. It has heretofore been the practice to position the presser devices at the rear end of the floating frame and to pivot the front end of said frame to the front end of the sub-frame, the rear ends of the two frames being yieldably connected by a pair of adjustable compression springs which operate to force the presser devices downwardly under the necessary and desired pressure. In general this arrangement has proved to be impractical because the position of the frame carrying the presser devices is governed by the position or elevation of the furrow-opener frame and consequently the soil is not packed around the plants under a constant pressure, it being manifest that when the sub-frame is adjusted into its extreme lower position to cause the furrow to be of maximum depth, the presser devices are under greater spring tension and in closer proximity to the soil than when the sub-frame is adjusted into an intermediate or its uppermost position. A further disadvantage of the aforementioned arrangement or construction is that the angle bars at the sides of the floating frame tend to restrict the space between the furrow-opener and the presser devices and consequently it is difficult and more or less inconvenient to manipulate and deposit the plants into place.

The primary object of the present invention is to provide a transplanter of the type under consideration, in which the floating frame is so arranged that it does not impair or interfere with the plant setting and is supported independently of the furrow-opener frame so that it is not affected by the latter's position and the presser devices operate to press the soil around the plants under a substantially uniform or constant pressure. This improved transplanter may be described in general as comprising a floating frame which is pivotally connected at the rear end to some relatively fixed member of the carrying frame, such, for example, as the axle for the rear wheels, and has the presser wheels or plates mounted at the front end thereof.

Another object of the invention is to provide a transplanter which is of new and improved construction and is of a maximum efficiency as far as operation is concerned.

A further object of the invention is to provide a transplanter which is an improvement upon the one disclosed in Letters Patent of the United States, No. 1,651,861, granted to Henry Synck on the 6th day of December, 1927.

Other objects and advantages will be apparent from a consideration of the following detailed description.

In the drawings which accompany and form a part of this specification or disclosure and in which like numerals of reference denote corresponding parts throughout the several views:

Figure 1 is a longitudinal sectional view of a transplanter embodying the invention;

Figure 2 is a plan view, parts being omitted for purposes of illustration;

Figure 3 is a perspective of the frame that carries the presser wheels or plates;

Figure 4 is a fragmentary sectional view illustrating a transplanter embodying a modified form of the invention; and Figure 5 is a view showing in detail the frame arrangement disclosed in Figure 4.

The invention is exemplified in a transplanter comprising a main carrying frame which consists of a pair of angle-iron sills or side members 5. These sills are held in spaced relation by a channel iron cross bar 6 which is rigidly secured to the front ends of said sills and is in the form of an arch so as to extend over the dirigible front wheels 7 of the transplanters. The wheels 7 are journalled on a comparatively short cross-axle 8 which is connected to the lower end of a king-pin 9. The upper end of this king-pin is mounted in a bearing 10 which is secured to the central portion of the arch or cross bar 6. The rear ends of the sills 5 are bent so as to extend upwardly and are rigidly secured to the central portions of a pair of forwardly extending angle iron arm members 11. The latter are connected at their front ends by a cross-bar 12 and at their rear ends by a cross-bar 13. Both bars 12 and 13 are formed of angle iron and together with the arch 6, sills 5 and arm members 11 form a rigid frame structure. Diagonal braces 14 are provided at the corners of the frame for reinforcing purposes. The front ends of the arm members 11 are supported from the sills 5 by vertical braces 15. The rear end of the transplanter is carried by a pair of ground wheels 16 which are rotatably mounted on the ends of an axle 17. The latter is journalled in a pair of bearing brackets 18 which are secured to the sills 5 respectively. A draft tongue 19 is connected to the king-pin 9.

Relatively long seats 20 for the plant-setters or operatives are suitably supported between the front ends of the sills and the bent portions at the rear. Plant boxes 21 are supported above the front ends of these seats by means of an arch 22 which has the leg or side-members thereof rigidly connected to the sills 5. Foot rests 23 and back rests 23ª are suitably supported in place adjacent the front and rear ends of the seats respectively. A tank 24 from which water is supplied to the plants, is carried at the rear of the transplanter and is mounted in arcuate seats 25 which are formed in the arm members 11. A seat 26 for the driver of the transplanter is secured to the top of the tank. The cross-bar 12 operates as a step for the driver and also as a foot rest.

A furrow-opener 27 is disposed directly behind the dirigible front wheels 7 and is fixed to the front end of a sub-frame which comprises a pair of substantially parallel side members 28. The latter are formed of angle iron and are held in spaced relation by cross-bars 29 and 30. These bars are riveted or otherwise secured to the side members 28 so as to form a rigid structure. The side members 28 are spaced apart so as to leave a comparatively wide space between them through which the plants may be deposited by the operatives into the furrow. The rear ends of the side members 28 are bent so as to extend upwardly and are pivotally connected to lugs 31 which are secured to the cross-bar 13 at the rear end of the transplanter. By connecting the side members in this manner the sub-frame is suspended so that its front end may be raised or lowered to adjust the position of the furrow-opener. The sub-frame is locked in its various positions by means of a hand lever 32 which is disposed at one side of the tank 24 and is extended so as to be within convenient reach of the driver. This lever is fixed to the rear axle 17 and carries a manually operable locking device 33 which cooperates with an arcuate rack 34. The latter is secured in any suitable manner to one of the arm members 11. Arms 35 are fixed to the axle 17 and are operatively connected to the side members 28 by turn-buckle connections 36. When it is desired to adjust the position of the sub-frame so as to raise or lower the furrow-opener the lever 32 will be shifted either rearwardly or forwardly to rotate the axle 17 and the arms 35. This rotary movement is in turn imparted to the turn-buckle connections and effects the desired adjustment. The aforementioned turn-buckle connections are in the form of links which are pivotally connected to the side members 28 and the distal ends of the arms 35. The furrow-opener comprises a pair of reversely curved plates 27ª which are connected to the cross-bars 29 and 30. The sub-frame embodies no cross-bar behind the rear end of the opener 27 with the result that the space through which the plants are deposited into the furrow is free from obstruction. The side members 28 are preferably arranged so that they are positioned adjacent the inner side margins of the seats 20 and consequently they do not interfere with the transplanting operation.

The soil displaced by the furrow-opener 27 is pressed or forced back in place and around the roots of the plants that are deposited into the furrow, by means of a pair of presser-wheels 37 which are supported as hereinafter described at the front end of the floating frame. The latter comprises a pair of angle-iron side members 38 which overlie the side members 28 and have brackets 39 fixed to their rear ends. These brackets are pivotally mounted on the axle 17 so that the frame is free to swing upwardly or downwardly in response to hillocks or depressions in the subjacent soil. The brackets 39 abut against the inner faces of the arms 35 so that the floating frame, that is, the frame for the presser-wheels is held against transverse movement. The wheels 37 are preferably arranged so as to extend at an angle and are rotatably mounted on spindles 40 which are fixed respectively to the lower ends of a pair of brackets 41. The upper ends of these brackets extend outwardly and are bolted to the front ends of the side members 38. A cross-bar 42 is rigidly connected to the rear ends of the members 38 so that the latter will be held in rigid relation and the presser-wheels will move upwardly and downwardly in unison. Said side members are so positioned that the front ends thereof terminate rearwardly of the furrow-opener and consequently do not interfere with or obstruct the placement of the plants into the furrow. A characteristic of disposing and supporting the floating frame in the manner set forth is that the position of said frame is not affected by the position of the frame carrying the furrow-opener. Furthermore there are no side members or bars which would tend to restrict the space directly behind the furrow-opener 27 and between the side members 28.

The floating frame is pressed downwardly so as to force the presser wheels 37 into contact with the soil displaced by the furrow-opener, by means of a pair of compression springs 43 which are disposed between the side members 38 and the cross-bar 12 of the main carrying frame. These springs are held in place against displacement by a pair of guide rods 44 which have their lower ends pivotally connected to the intermediate part of the side members 38 and their upper ends slidably mounted in elongated recesses or slots 45 which are formed in the cross-bar 12. Knobs or shoulders 46 are formed on the upper ends of the guide rods to prevent the rods from sliding out of engagement with the cross-bar. Nuts 47 and lock nuts 48 are threaded to the lower ends of the rods 44 and form abutments for the lower ends of the springs. By adjusting the position of these nuts the tension or force of the springs may be varied so as to meet the various requirements. A characteristic of disposing the springs so that they extend between the side members 38 and a member or part of the main frame is that the floating frame is under a spring pressure which is uniform and is not changed or affected by an adjustment of the sub-frame.

In the modified form of the invention, shown in Figures 4 and 5, the floating frame embodies press-plates 37ª instead of presser-wheels and is forced downwardly by a pair of springs 43ª which extend between the angle-iron side members 38 and nuts 47ª on the outer ends of a pair of rods 44ª which are connected to the side members 28 of the sub-frame. These springs operate in exactly the same manner as the springs 43 (Figures 1 and 2) and the pressure thereof is not affected to any material or substantial degree by a change in the elevation of the sub-frame because they are positioned adjacent the rear ends of the side-members 28 and near the pivot-lugs 31 where the vertical movement of said side members is very small. With respect to the use of press-plates instead of presser-wheels it is to be understood that both produce the same result and either or equivalent devices may be used equally as well as far as the invention is concerned and as is customary and well understood in the art.

In operation, the driver will set and lock the sub-frame to cause the opener 27 to cut a furrow of the desired depth. Since the main frame is carried a predetermined distance above the ground and the sub-frame is rigidly locked in place, the furrow will be of a uniform depth despite variations in the density of the soil. The operatives or plant setters on the seats 20 will take the plants from the boxes 21 and deposit them into the furrow immediately behind the opener 27. After the plants have been set the wheels or plates will uniformly press or force back the displaced soil around the roots of the plants and close the furrow. In the event that it is deemed necessary to apply more or less pressure to the wheels, the nuts provided for that purpose will be adjusted into the desired position to vary the compression of the springs.

The transplanter herein described is extremely efficient in operation since the opening through which the plants are inserted into the furrow is of maximum width and the floating frame on which the presser wheels are mounted is pivotally supported independently of the sub-frame.

The invention is not to be understood as limited or restricted to the specific details set forth, since these may be modified within the scope of the appended claims, without departing from the spirit and scope of the invention.

Having thus described the invention, what I claim as new and desire to secure by Letters Patent, is:

1. In a transplanter, the combination of a main frame comprising a pair of side members, front and rear ground wheels for the main frame, a furrow-opener disposed behind the front wheels and between said side members, a sub-frame connected to the main frame and to which the furrow-opener is secured, devices in front of the rear wheels and behind and spaced from the furrow-opener for pushing the soil around the roots of plants deposited into the furrow, a frame connected at the rear end thereof to the main frame and to the front end of which said devices are secured, and a seat mounted on one of the side members between the front and rear wheels for carrying an operator in a position so he may drop the plants between the side members and deposit them directly into the furrow between said opener and devices.

2. In a transplanter, the combination of a main frame comprising a pair of side members, front and rear ground wheels for the main frame, a furrow-opener disposed behind the front wheels and between said side members, a sub-frame connected to the main frame and to which the furrow-opener is secured, devices in front of the rear wheels and behind and spaced from the furrow-opener for pushing the soil around the roots of plants deposited into the furrow, a frame connected at the rear end thereof to the main frame and to the front end of which said devices are secured, spring means operative to force the devices into contact with the soil, and a seat mounted on one of the side members between the front and rear wheels for carrying an operator in a position so he may drop the plants between the side members and deposit them directly into the furrow between said opener and devices.

3. In a transplanter, the combination of a main frame comprising a pair of side members, front and rear ground wheels for the main frame, a furrow-opener disposed behind the front wheels and between said side members, a sub-frame movably connected to the main frame and to which the furrow-opener is secured, means for locking the sub-frame to said main frame so that the opener will cut a furrow of substantially uniform depth, devices in front of the rear wheels and behind and spaced from the furrow-opener for pushing the soil around the roots of plants deposited into the furrow, a frame connected at the rear end thereof to the main frame and to the front end of which said devices are secured, spring means operative to force the devices into contact with the soil, and a seat mounted on one of the side members between the front and rear wheels for carrying an operator in a position so he may drop the plants between the side members and deposit them directly into the furrow between said opener and devices.

4. In a transplanter, the combination of a main frame comprising a pair of side members and a cross element at the rear end thereof, front and rear ground wheels for the main frame, a furrow-opener disposed behind the front wheels and between said side members, a sub-frame connected to the main frame and to which the furrow-opener is secured, devices in front of the rear wheels and behind and spaced from the furrow-opener for pushing the soil around the roots of plants deposited into the furrow, a frame pivotally connected at the rear end thereof to said cross element and to the front end of which said devices are secured, spring means operative to force downwardly the frame carrying the soil pushing devices, and a seat mounted on one of the side members between the front and rear wheels for carrying an operator in a position so he may drop plants between the side members and deposit them directly into the furrow between said opener and devices.

5. In a transplanter, the combination of a main frame comprising a pair of side members and a cross element at the rear end thereof, front and rear ground wheels for the main frame, a furrow-opener disposed behind the front wheels and between said side members, a sub-frame connected to the main frame and to which the furrow-opener is secured, devices in front of the rear wheels and behind and spaced from the furrow-opener for pushing the soil around the roots of plants deposited into the furrow, a frame pivotally connected at the rear end thereof to said cross element and to the front end of which said soil pushing devices are secured, a spring between the main frame and the frame carrying the pushing devices operative to press said devices into contact with the soil, and a seat mounted on one of the side members between the front and rear wheels for carrying an operator in a position so he may drop plants between the side members and deposit them directly into the furrow between said opener and devices.

6. In a transplanter, the combination of a main frame comprising a pair of side members, front and rear ground wheels for the main frame, a furrow-opener disposed behind the front wheels and between said side members, a sub-frame connected to the main frame and to which the furrow-opener is secured, devices in front of the rear wheels and behind and spaced from the furrow-opener for pushing the soil around the roots of plants deposited into the furrow, a frame pivotally connected at the rear end thereof to the axle for the rear wheels and to the front end of which said soil pushing devices are secured, a spring operative to force downwardly the frame carrying the said devices, and a seat mounted on one of the side members between the front and rear wheels for carrying an operator in a position so he may drop plants between the side members and deposit them directly into the furrow between said opener and devices.

7. In a transplanter, the combination of a main frame comprising a pair of side members and a cross bar at the rear end thereof, front and rear ground wheels for the main frame, a furrow-opener disposed behind the front wheels and between said side members, a sub-frame connected to the main frame and to which the furrow-opener is secured, devices in front of the rear wheels and behind and spaced from the furrow-opener for pushing the soil around the roots of plants deposited in the furrow, a frame pivotally connected at the rear end thereof to said main frame and to the front end of which said soil pushing devices are secured, a spring extending between the cross bar and the frame carrying said devices to force downwardly said last mentioned frame, and a seat mounted on one of the side members between the front and rear wheels for carrying an operator in a position so he may drop plants between the side members and deposit them directly into the furrow between said opener and devices.

8. In a transplanter, the combination of a main frame comprising a pair of side members, front and rear ground wheels for the main frame, a furrow-opener disposed behind the front wheels and between said side members, a sub-frame connected to the main frame and to which the furrow-opener is secured, devices in front of the rear wheels and behind and spaced from the furrow opener for pushing the soil around the roots of the plants deposited into the furrow, a frame pivotally connected to the main frame and to the distal end of which the soil pushing devices are secured, a spring extending between said main frame and the frame carrying said devices operative to force downwardly said last mentioned frame, and a seat mounted on one of the side members between the front and rear wheels for carrying an operator in a position so he may drop the plants between the side members and deposit them directly into the furrow between said opener and devices.

9. In a transplanter, the combination of a main frame comprising a pair of side members, front and rear ground wheels for the main frame, a furrow-opener disposed behind the front wheels and between said side members, a sub-frame connected to the main frame and to which the furrow-opener is secured, a pair of devices in front of the rear wheels and behind and spaced from the furrow-opener for pushing the soil around the roots of plants deposited into the furrow, a pair of side members pivotally connected at the rear ends thereof and to the front ends of which the soil pushing devices are secured respectively, spring means operative to force downwardly the last mentioned side members and force said devices into contact with the soil, and a seat mounted on one of the side members between the front and rear wheels for carrying an operator in a position so he may drop the plants between the side members and deposit them directly into the furrow between said opener and devices.

10. In a transplanter, the combination of a main frame comprising a pair of side members and a cross element at the rear end thereof, front and rear ground wheels for the main frame, a furrow-opener disposed behind the front wheels and between said side members, a sub-frame movably connected to the main frame and to which the furrow-opener is secured, a pair of devices in front of the rear wheels and behind and spaced from the furrow-opener for pushing the soil around the roots of plants deposited into the furrow, a pair of longitudinally extending side members pivotally connected at the rear ends thereof to the cross element and to the front ends of which the soil pushing devices are secured respectively, spring means operative to force downwardly the longitudinal side members and force said devices into contact with the soil, and a seat mounted on one of the side members between the front and rear wheels for carrying an operator in a position so he may drop the plants between the side members and deposit them directly into the furrow between said opener and devices.

11. In a transplanter, the combination of a main frame having a pair of front and ground wheels for the main frame, a furrow-opener disposed behind the front wheels and between said side members, a sub-frame movably connected to the rear end of the main frame and to the front end of which the furrow-opener is secured, means for locking the sub-frame to the main frame so the opener will cut a furrow of substantially uniform depth, said sub-frame being formed to leave a space through which plants may be dropped between the opener and into the furrow device in front of the rear wheels and behind and spaced from said furrow opener for pushing the soil around the roots of plants deposited into the furrow, a frame overlying the rear end of the sub-frame and to the front end of which the soil-pushing devices are secured, said last mentioned frame being pivoted at its rear end, and a seat mounted on one of said members between the front and rear wheels for carrying an operator in a position so he may drop the plants through the space in the sub-frame and deposit them directly into the furrow between said opener and devices.

12. In a transplanter, the combination of a main frame comprising a pair of side members, front and rear ground wheels for the main frame, a furrow-opener disposed behind the front wheels and between said side members, a sub-frame movably connected to the rear end of the main frame and to the front end of which the furrow-opener is secured, means for locking the sub-frame to the main frame so the opener will cut a furrow of substantially uniform depth, said sub-frame being formed to leave a space through which plants may be dropped behind the opener and into the furrow, devices in front of the rear wheels and behind and spaced from said furrow-opener for pushing the soil around the roots of plants deposited into the furrow, a frame overlying the rear end of the sub-frame and to the front end of which the soil pushing devices are secured, said last mentioned frame being pivoted at its rear end, spring means operative to force downwardly the frame carrying said devices, and a seat mounted on one of the side members between the front and rear wheels for carrying an operator in position so he may drop the plants through the space in the sub-frame and deposit them directly into the furrow between said opener and devices.

13. In a transplanter, the combination of a main frame comprising a pair of side members, front and rear ground wheels for the main frame, a furrow-opener disposed behind the front wheels and between said side members, a sub-frame movably connected to the rear end of the main frame and to the front end of which the furrow-opener is secured, means for locking the sub-frame to the main frame so the opener will cut a furrow of substantially uniform depth, said sub-frame being formed to leave a space through which plants may be dropped behind the opener and into the furrow, devices in front of the rear wheels and behind and spaced from said furrow-opener for pushing the soil around the roots of plants deposited into the furrow, a frame overlying the rear end of the sub-frame and to the front end of which the soil pushing devices are secured, said last mentioned frame being pivoted at its rear end to the main frame, spring means operative to force downwardly the frame carrying said devices, and a seat mounted on one of the side members between the front and rear wheels for carrying an operator in position so he may drop the plants through the space in the sub-frame and deposit them directly into the furrow between said opener and devices.

14. In a transplanter, the combination of a main frame comprising a pair of side members, front and rear ground wheels for the main frame, a furrow-opener disposed behind the front wheels and between said side members, a sub-frame movably connected to the rear end of the main frame and to the front end of which the furrow-opener is secured, means for locking the sub-frame to the main frame so the opener will cut a furrow of substantially uniform depth, said sub-frame being formed to leave a space through which plants may be dropped behind the opener and into the furrow, devices in front of the rear wheels and behind and spaced from said furrow-opener for pushing the soil around the roots of plants deposited into the furrow, a frame overlying the rear end of the sub-frame and to the front end of which the soil pushing devices are secured, said last mentioned frame being pivoted at its rear end to the main frame, a spring disposed between the main frame and the frame carrying said devices operative to force the latter downwardly, means for varying the tension of the spring, and a seat mounted on one of the side members between the front and rear wheels for carrying an operator in position so he may drop the plants through the space in the sub-frame and deposit them directly into the furrow between said opener and devices.

Signed at Coldwater, Ohio, this 19th day of April, 1928.

THEODORE H. OPPENHEIM.